United States Patent [19]
Cho et al.

[11] Patent Number: 5,594,413
[45] Date of Patent: Jan. 14, 1997

[54] CAR COLLISION PREVENTION APPARATUS AND METHOD USING DUAL PROCESSOR AND AUTOMATIC SENSOR SWITCHING FUNCTION

[75] Inventors: Jung S. Cho; Je S. Song, both of Kyoungki-do, Rep. of Korea

[73] Assignee: Hyundai Electronics Industries Co., Ltd., Kyoungki-do, Rep. of Korea

[21] Appl. No.: 350,554

[22] Filed: Dec. 7, 1994

[30] Foreign Application Priority Data

Dec. 27, 1993 [KR] Rep. of Korea ............ 93-29738
Dec. 29, 1993 [KR] Rep. of Korea ............ 93-30578

[51] Int. Cl.$^6$ .................................. B60Q 1/00
[52] U.S. Cl. ............ 340/435; 180/169; 340/903; 342/71; 364/461; 367/112; 367/909
[58] Field of Search ............ 340/435, 436, 340/901, 903, 904; 342/70, 71; 367/909, 112, 96, 97, 107; 180/167, 168, 169, 170; 364/460, 461, 426.04

[56] References Cited

U.S. PATENT DOCUMENTS

| | | | |
|---|---|---|---|
| 3,952,301 | 4/1976 | Sorkin | 342/71 |
| 4,632,543 | 12/1986 | Endo | 180/167 |
| 5,165,497 | 11/1992 | Chi | 180/169 |
| 5,173,881 | 12/1992 | Sindle | 367/909 |
| 5,189,619 | 2/1993 | Adachi et al. | 364/424.05 |
| 5,215,159 | 6/1993 | Nishida | 180/169 |
| 5,396,426 | 3/1995 | Hibino et al. | 364/426.04 |

FOREIGN PATENT DOCUMENTS

| | | | |
|---|---|---|---|
| 5-119153 | 5/1993 | Japan . | |
| 5174296 | 7/1993 | Japan | 340/903 |

*Primary Examiner*—Nina Tong
*Attorney, Agent, or Firm*—Jordan and Hamburg

[57] ABSTRACT

Car collision prevention apparatus and method comprises a slave processor for transmitting and receiving a laser beam or an ultrasonic wave signal to extract distance information between a car and a car in front, and a master processor for comparing the extracted distance information from the slave processor with a safety distance between the car and the front car based on a car speed and performing car accelerating or decelerating and alarm functions in accordance with the compared result. The slave processor comprises a long-distance sensing laser sensor and a short-distance sensing ultrasonic wave sensor disposed in a front side of the car, the long-distance sensing laser sensor consisting of a laser trigger circuit, a laser transmitter and a laser receiver, the short-distance sensing ultrasonic wave sensor consisting of an ultrasonic wave trigger circuit, an ultrasonic wave transmitter and an ultrasonic wave receiver. The long-distance sensing laser sensor is driven in long-distance mode of the car in which the car speed is higher than a reference speed. The short-distance sensing ultrasonic wave sensor is driven in short-distance mode of the car in which the car speed is lower than the reference speed.

4 Claims, 7 Drawing Sheets

CAR COLLISION PREVENTION APPARATUS AND METHOD USING DUAL PROCESSOR AND AUTOMATIC SENSOR SWITCHING FUNCTION

BACKGROUND OF THE INVENTION

The present invention relates in general to a car collision prevention system for sensing a collision danger and giving an alarm as a result of the sensing, and more particularly to a car collision prevention apparatus and method using dual processors and an automatic sensor switching function in which the dual processors are provided to reduce a load due to an effect of interline and electronic interference in the car where the automatic sensor switching function is performed on the basis of car speed data to automatically switch an ultrasonic wave sensor and a laser sensor for distance measurement in short or long-distance traveling situations of the car.

A car accident is a serious problem directly affecting lives of a driver and passengers in the car. Various safety equipment has been developed for preventing car accidents in response to an increase in the number of the car accidents and an increase in the number of the cars. However, such safety equipment does not take precautions against occurrence of the car accident, it does reduce the danger level in occurrence of the car accident, the object thereof being to save the lives in the occurrence of an accident. To solve this problem, there has recently been proposed a car collision prevention system which senses a collision danger and gives an alarm as a result of the sensing. Such a car collision prevention system performs a distance measurement function using an ultrasonic wave or a laser beam.

However, the car collision prevention system using the distance measurement function has a disadvantage in that it employs a single processor, resulting in a limited software loop time. Also, the use of the single processor presents difficulty in adding a separate function or coupling with other equipment, because the single processor has a limited capacity. Further, the use of only the laser beam makes it hard to measure accurately a distance to an object within a short distance. As a result, the short-distance measurement cannot precisely be performed. This results in a faulty operation of the system in low-speed traveling situations of the car, such as urban traveling.

SUMMARY OF THE INVENTION

The present invention is made in view of the above problems, and it is an object of the present invention to provide a car collision prevention apparatus and method using dual processors and an automatic sensor switching function in which one processor is provided to transmit and receive a laser beam or an ultrasonic wave to extract distance between a car and a car in front, the other processor is provided to give an alarm according to the extracted distance information from the one processor and car speed data, a laser sensor is provided to perform a long-distance measurement function using the laser beam, an ultrasonic wave sensor is provided to perform a short-distance measurement function using the ultrasonic wave so that the presence of the front car can be discriminated, a distance to the front car is monitored upon the presence of the front car and the alarm is given to the user or the brake is applied when a dangerous situation is present involving the car and the front car.

In accordance with one aspect of the present invention, there is provided a car collision prevention apparatus comprising slave processing means for transmitting and receiving a laser beam or an ultrasonic wave signal to measure the distance between a car and a car in front; and master processing means for comparing the measured distance information from said slave processing means with a safety distance for distancing the car and the front car based on a car speed and performing car accelerating or decelerating and alarm functions in accordance with the compared result.

In accordance with another aspect of the present invention, there is provided a car collision prevention method comprising the steps of allowing a slave processor to transmit and receive a laser beam or an ultrasonic wave signal to measure the distance between a car and a car in front; and allowing a master processor to compare the measured distance information from the slave processor with a safety distance for distancing the car and the front car based on a car speed and perform car accelerating or decelerating and alarm functions in accordance with the compared result.

Also, in accordance with the one aspect of the present invention, the slave processing means comprises laser trigger means for generating a laser trigger pulse signal in response to a drive signal from said master processing means in long-distance traveling of the car in which the car speed is higher than a reference speed; laser transmission means for emitting the laser beam externally in response to the laser trigger pulse signal from said laser trigger means; laser reception means for receiving the laser beam which is emitted from the laser transmission means and then reflected from the front car; ultrasonic wave trigger means for generating an ultrasonic wave trigger pulse signal in response to the drive signal from the master processing means in short-distance traveling of the car in which the car speed is lower than the reference speed; ultrasonic wave transmission means for emitting the ultrasonic wave signal externally in response to the ultrasonic wave trigger pulse signal from the ultrasonic wave trigger means; ultrasonic wave reception means for receiving the ultrasonic wave signal which is emitted from the ultrasonic wave transmission means and then reflected from the front car; counting means for starting a counting operation in response to the laser trigger pulse signal from the laser trigger means or the ultrasonic wave trigger pulse signal from the ultrasonic wave trigger means and stopping the counting operation in response to an output signal from the laser reception means or, an output signal from the ultrasonic wave reception means; and distance information transmission means for converting time data from the counting means into the distance information and transmitting the converted distance information to the master processing means.

Further, in accordance with the one aspect of the present invention, the master processing means comprises distance information reception means for receiving the distance information from the slave processing means; car speed sensing means for sensing the car speed and calculating the safety distance between the car and the front car on the basis of the sensed car speed; data processing means for comparing the distance information received by the distance information reception with the calculated safety distance from the car speed sensing means to give an alarm when a dangerous situation is present between the car and the front car in accordance with the compared result and outputting a drive signal to laser trigger means or ultrasonic wave trigger means in the slave processing means according to the car speed sensed by the car speed sensing means; and brake control means for controlling a brake of the car in response to an alarm signal from the data processing means to decelerate the car.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
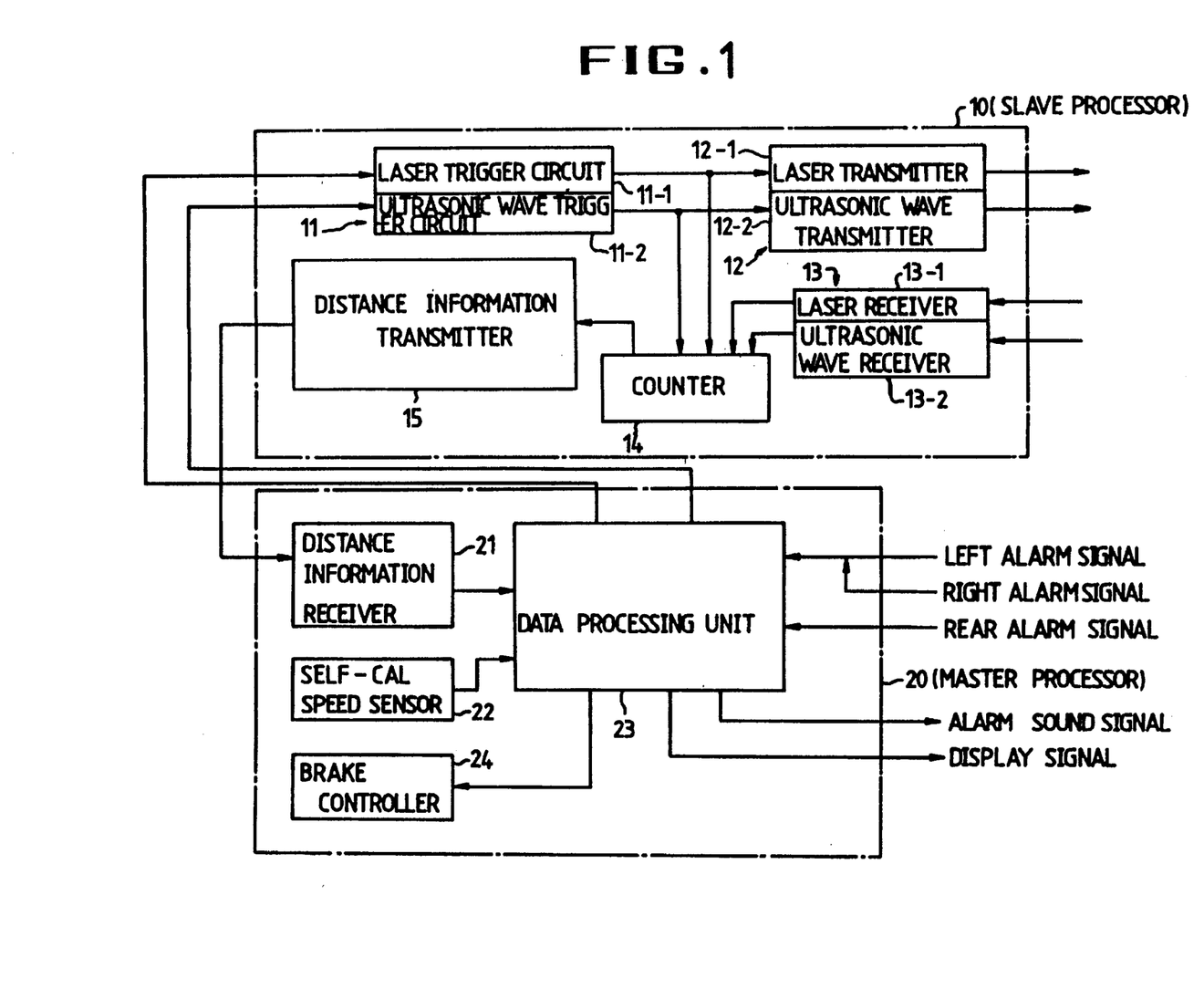
FIG. 1 is a block diagram of a car collision prevention apparatus using a dual processor and an automatic sensor switching function in accordance with the present invention.

Referring to FIG. 1, there is shown a block diagram of a car collision prevention apparatus using dual processors and an automatic sensor switching function in accordance with the present invention. As shown in this drawing, the car collision prevention apparatus comprises a slave processor 10 for transmitting and receiving a laser beam or an ultrasonic wave signal to measure distance between a car and a car in front, and a master processor 20 for comparing the measured distance information from the slave processor 10 with a safety distance for distancing the car and the front car based on a car speed and performing car accelerating or decelerating and alarm functions in accordance with the compared result.

The slave processor 10 comprises a laser trigger circuit 11-1 for generating a laser trigger pulse signal in response to a drive signal from the master processor 20 in long-distance traveling mode of the car in which the car speed is higher than a reference speed, a laser transmitter 12-1 for emitting the laser beam externally in response to the laser trigger pulse signal from the laser trigger circuit 11-1, and a laser receiver 13-1 for receiving the laser beam which is emitted from the laser transmitter 12-1 and then reflected from the front car.

The slave processor 10 also comprises an ultrasonic wave trigger circuit 11-2 for generating an ultrasonic wave trigger pulse signal in response to the drive signal from the master processor 20 in short-distance traveling mode of the car in which the car speed is lower than the reference speed, an ultrasonic wave transmitter 12-2 for emitting the ultrasonic wave signal externally in response to the ultrasonic wave trigger pulse signal from the ultrasonic wave trigger circuit 11-2, and an ultrasonic wave receiver 13-2 for receiving the ultrasonic wave signal which is emitted from the ultrasonic wave transmitter 12-2 and then reflected from the front car.

Further, the slave processor 10 comprises a counter 14 for starting a counting operation in response to the laser trigger pulse signal from the laser trigger circuit 11-1 or the ultrasonic wave trigger pulse signal from the ultrasonic wave trigger circuit 11-2 and stopping the counting operation in response to an output signal from the laser receiver 13-1 or an output signal from the ultrasonic wave receiver 13-2, and a distance information transmitter 15 for converting time data from the counter 14 into the distance information and transmitting the converted distance information to the master processor 20.

The master processor 20 comprises a distance information receiver 21 for receiving the distance information from the slave processor 10, a car speed sensor 22 for sensing the car speed and calculating the safety distance for distancing the car and the front car on the basis of the sensed car speed, and a data processing unit 23 for comparing the distance information received by the distance information receiver 21 with the calculated safety distance from the car speed sensor 22 and giving an alarm when a dangerous situation is present between the car and the front car in accordance with the compared result.

Also, the data processing unit 23 outputs the drive signal to the laser trigger circuit 11-1 or the ultrasonic wave trigger circuit 11-2 in the slave processor 10 according to the car speed sensed by the car speed sensor 22.

Figure 3:
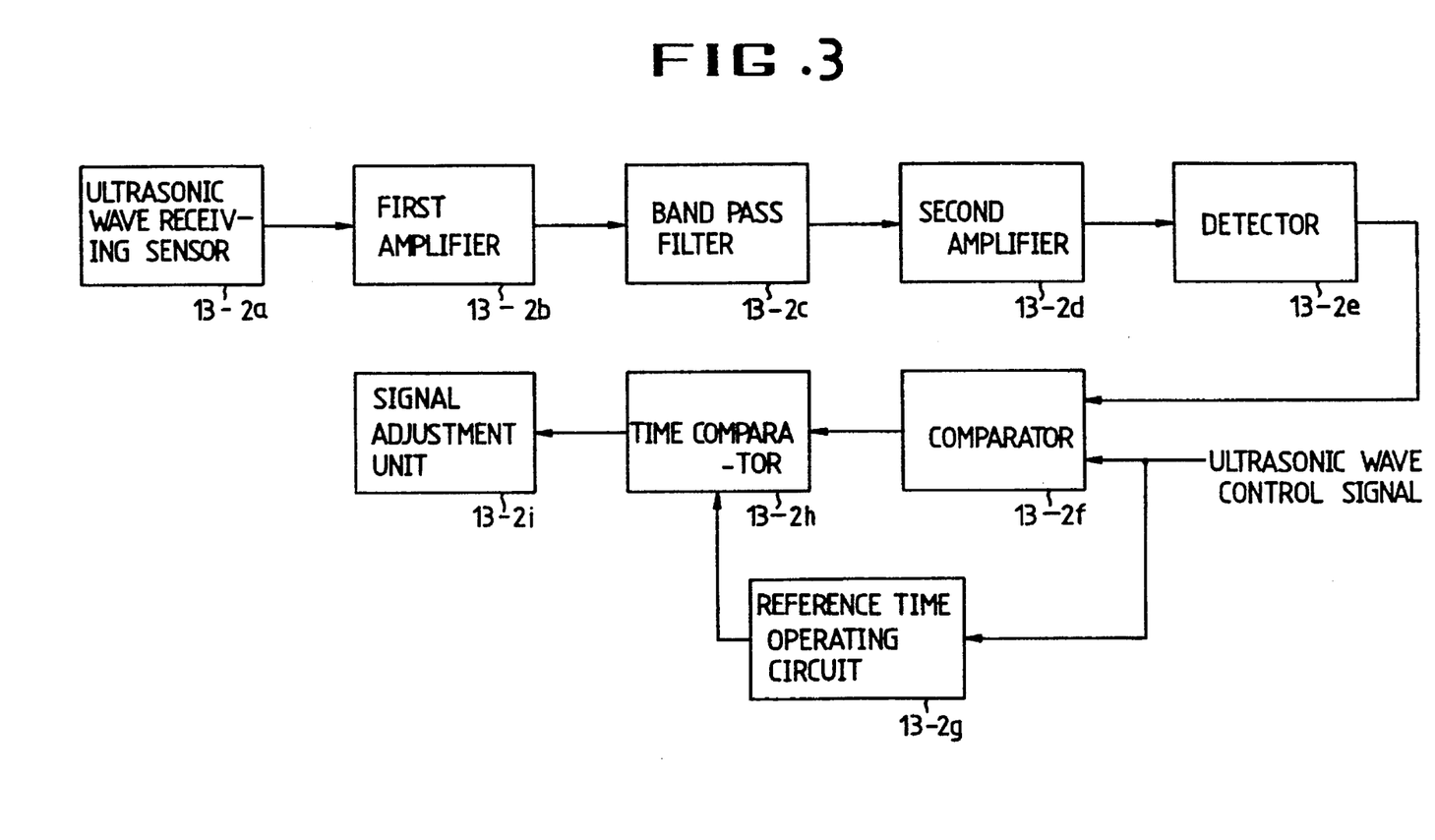
FIG. 3 is a detailed block diagram of an ultrasonic wave receiver in FIG. 1.

Further, the master processor 20 comprises a brake controller 24 for controlling a brake of the car in response to an alarm signal from the data processing unit 23 to decelerate the car. Referring to FIG. 3, there is shown a detailed block diagram of the ultrasonic wave receiver 13-2 in FIG. 1. As shown in this drawing, the ultrasonic wave receiver 13-2 includes an ultrasonic wave receiving sensor 13-2a for receiving the ultrasonic wave signal which is emitted from the ultrasonic wave transmitter 12-2 and then reflected from the front car, a first amplifier 13-2b for amplifying an output signal from the ultrasonic wave receiving sensor 13-2a, a band pass filter 13-2c for band pass filtering an output signal from the first amplifier 13-2b to remove a noise component therefrom, a second amplifier 13-2d for amplifying an output signal from the band pass filter 13-2c, and a detector 13-2e for detecting an output signal from the second amplifier 13-2d and outputting the detected signal in a digital form.

The ultrasonic wave receiver 13-2 also includes a comparator 13-2f for comparing an output signal from the detector 13-2e with an ultrasonic wave control signal from the ultrasonic wave transmitter 12-2, a reference time operating circuit 13-2g for operating for a reference time determined by the ultrasonic wave control signal from the ultrasonic wave transmitter 12-2, a time comparator 13-2h for comparing an output signal from the comparator 13-2f with an output signal from the reference time operating circuit 13-2g, and a signal adjustment unit 13-2i for adjusting an output signal from the time comparator 13-2h so that it can be processed by the distance information transmitter 15.

Figure 4:
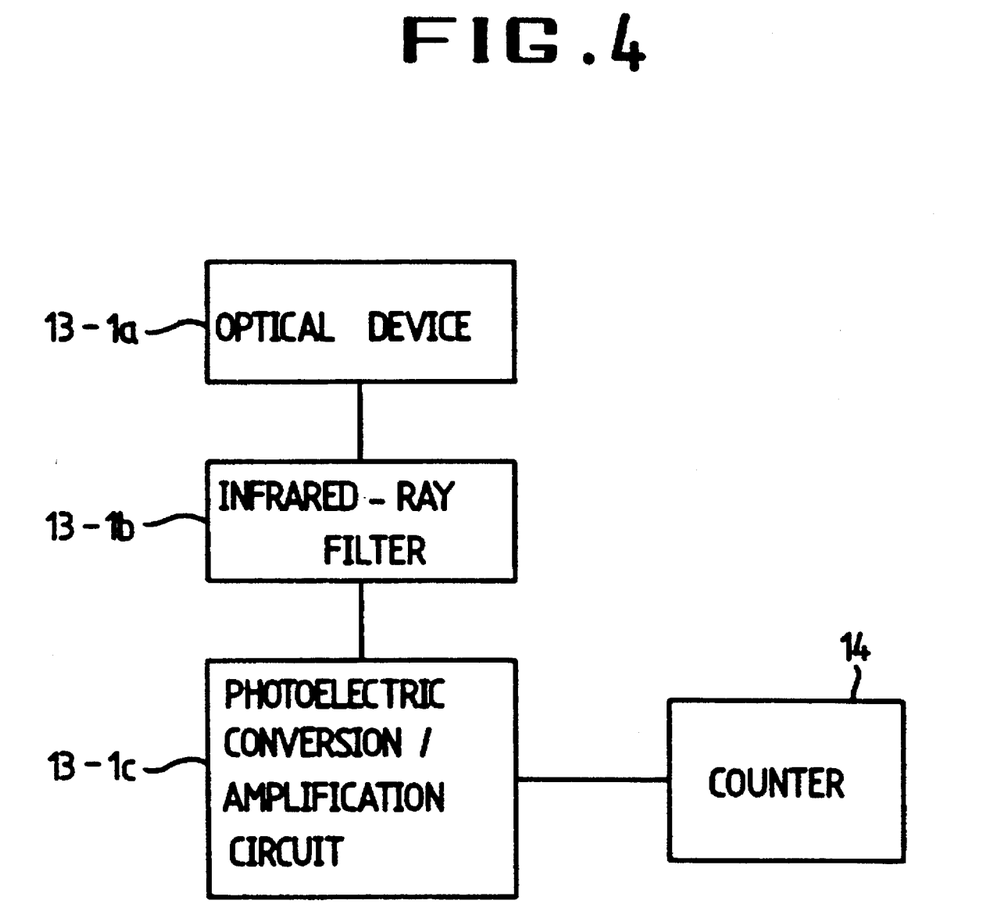
FIG. 4 is a detailed block diagram of a laser receiver in FIG. 1.

Referring to FIG. 4, there is shown a detailed block diagram of the laser receiver 13-1 in FIG. 1. As shown in this drawing, the laser receiver 13-1 includes an optical device 13-1a for condensing the laser beam which is emitted from the laser transmitter 12-1 and then reflected from the front car, an infrared-ray filter 13-1b for passing only a part of the laser beam condensed by the optical device 13-1a, corresponding to the laser beam emitted from the laser transmitter 12-1, to remove an external light beam therefrom, and a photoelectric conversion/amplification circuit 13-1c for converting an output signal from the infrared-ray filter 13-1b into an electrical signal and amplifying the converted electrical signal.

The operation of the car collision prevention apparatus with the above-mentioned construction in accordance with the present invention will hereinafter be described in detail.

In accordance with the present invention, the slave processor 10 comprises a long-distance sensing laser sensor and a short-distance sensing ultrasonic wave sensor disposed in a front side of the car, the long-distance sensing laser sensor includes the laser trigger circuit 11-1, the laser transmitter 12-1 and the laser receiver 13-1, and the short-distance sensing ultrasonic wave sensor includes of the ultrasonic wave trigger circuit 11-2, the ultrasonic wave transmitter 12-2 and the ultrasonic wave receiver 13-2. The car speed is sensed by the car speed sensor 22 in the master processor 20. In accordance with the sensed car speed, the laser trigger circuit 11-1 in the slave processor 10 is driven by the data processing unit 23 in the master processor 20 to monitor the frontal situation when the car speed is higher than the reference speed. On the contrary, when the car speed is lower than the reference speed, the ultrasonic wave trigger circuit 11-2 is driven by the data processing unit 23 in the master processor 20 to monitor the frontal situation. When the dangerous situation occurs between the car and the front car, the alarm is given to the user by the data processing unit 23 and the brake is applied by the brake controller 24.

First, the method of measuring the distance to the object using the laser transmitter and receiver in the long-distance traveling of the car will hereinafter be described.

The laser receiver 13-1 receives the laser beam which is emitted from the laser transmitter 12-1 and reflected from the object. Namely, in the laser receiver 13-1, the optical device 13-1a condenses the laser beam reflected from the object to receive it efficiently. The infrared-ray filter 13-1b passes only the part of the laser beam condensed by the optical device 13-1a, corresponding to the laser beam emitted from the laser transmitter 12-1, to remove the external light beam therefrom. Then, the photoelectric conversion/amplification circuit 13-1c converts the output signal from the infrared-ray filter 13-1b into the electrical signal and amplifies the converted electrical signal.

The converted electrical signal from the laser receiver 13-1 is applied to the counter 14 for the time measurement. The counter 14 starts the time counting operation upon receiving the laser trigger pulse signal from the laser trigger circuit 11-1 and stops the counting operation upon receiving the output signal from the laser receiver 13-1.

The distance information transmitter 15 converts the time data from the counter 14 into the distance information and transmits the converted distance information to the distance information receiver 21 in the master processor 20. The car speed sensor 22 in the master processor 20 senses the car speed and calculates the safety distance for distancing the car and the front car on the basis of the sensed car speed.

The distance calculating method using the counter 14 will hereinafter be described in more detail with reference to timing diagrams of FIGS. 2A to 2C.

Figure 2A:
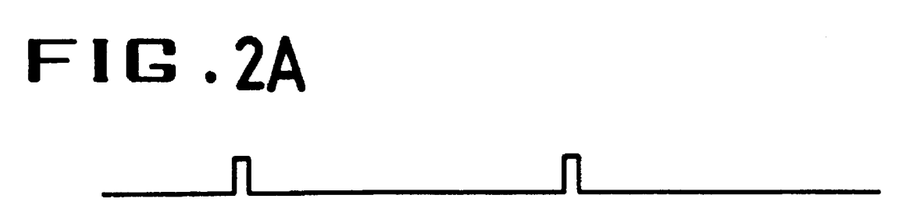
FIGS. 2A to 2F are timing diagrams of signals from components in FIG. 1.
Figure 2B:
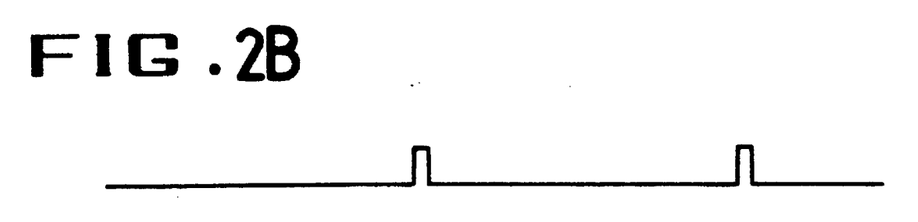
Figure 2C:
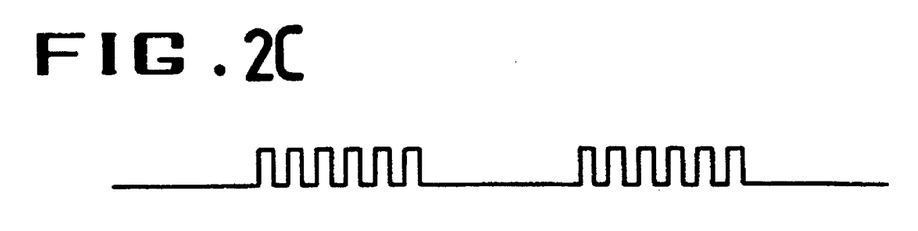

First, when the laser trigger pulse signal as shown in FIG. 2A is generated from the laser trigger circuit 11-1, the counter 14 starts the timing counting operation as shown in FIG. 2C.

Then, when the laser receiver 13-1 receives the reflected laser beam and provides its output signal as shown in FIG. 2B, the counter 14 stops the timing counting operation as shown in FIG. 2C.

The distance to the object is calculated on the basis of a light travel time by using the speed of light which is $3 \times 10^8$ [m/s]. As a result, by measuring the time period that the laser beam from the laser transmitter 12-1 is reflected from the object and then received by the laser receiver 13-1, the distance to the object can be obtained.

The light travel time to the object is measured by counting the time interval between the laser trigger pulse signal as shown in FIG. 2A and the output signal from the laser receiver 13-1 as shown in FIG. 2B synchronously with clocks at a very short period as shown in FIG. 2C.

Namely, the light travel time is obtained by multiplying the number of the clocks between the laser trigger pulse signal and the output signal from the laser receiver 13-1 by one clock period as follows:

$$t = T[\sec] \times n[\sec]$$

where, t is the light travel time and T is one clock period.

Then, the distance to the object is obtained on the basis of the light travel time and the speed of light as follows:

$$s = \{t[\sec] \times 3 \times 10^8 \ [m/s]\}/2$$

where, s is the distance to the object.

As mentioned above, the distance to the object can be measured with no contact using the laser beam.

Next, the method of measuring the distance to the object using the ultrasonic wave transmitter and receiver in the short-distance traveling of the car will hereinafter be described.

First, the operation of the ultrasonic wave transmitter 12-2 will hereinafter be described in more detail with reference to timing diagrams of FIGS. 2D to 2F.

Figure 2D:
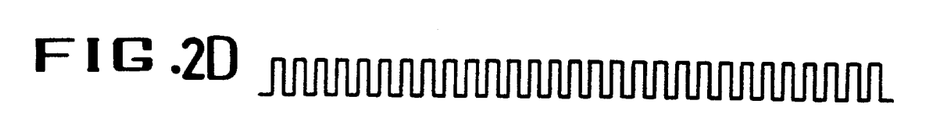
Figure 2E:
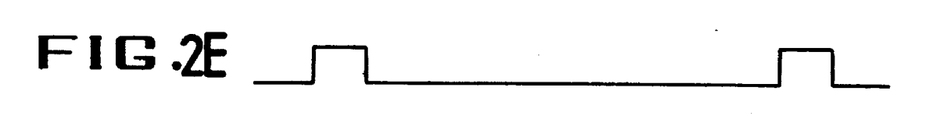
Figure 2F:
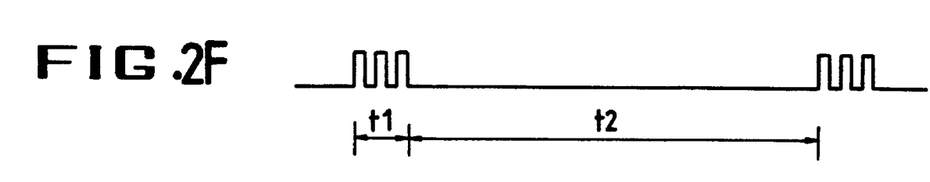

The ultrasonic wave trigger pulse signal as shown in FIG. 2D is generated from the ultrasonic wave trigger circuit 11-2, so that the output of the ultrasonic wave transmitter 12-2 is tuned to the best frequency as shown in FIG. 2F.

The output of the ultrasonic wave transmitter 12-2 is controlled by the ultrasonic wave control signal as shown in FIG. 2E to have transmission and standby intervals t1 and t2 as shown in FIG. 2F. A possible detection distance is determined by the standby interval t2, which is defined by the following equation (1):

$$t2 = \frac{\text{maximum detection distance (m)} * 2}{\text{ultrasonic wave moving speed (m/sec)}} \quad (1)$$

The ultrasonic wave speed in air is 340 m/sec. Therefore, the standby interval t2 must be adjusted suitably to the maximum detection distance.

Then, the ultrasonic wave signal from the ultrasonic wave transmitter 12-2 is received by the ultrasonic wave receiver 13-2. In detail, in the ultrasonic wave receiver 13-2, the ultrasonic wave receiving sensor 13-2a receives the ultrasonic wave signal which is emitted from the ultrasonic wave transmitter 12-2 and reflected from the object. The first amplifier 13-2b amplifies the output signal from the ultrasonic wave receiving sensor 13-2a. In this case, the output signal from the ultrasonic wave transmitter 12-2 is amplified together with the noise component. For this reason, the band pass filter 13-2c band pass filters the output signal from the first amplifier 13-2b to remove the noise component therefrom. Then, the second amplifier 13-2d amplifies the output signal from the band pass filter 13-2c.

Because the output signal from the second amplifier 13-2d is an alternating current (AC) component, it is detected and outputted in a pulse form by the detector 13-2e.

The output signal from the detector 13-2e is applied to one input terminal of the comparator 13-2f, the other input terminal receives the ultrasonic wave control signal from the ultrasonic wave transmitter 12-2. The application of the ultrasonic wave control signal to the comparator 13-2f is for blocking an ultrasonic wave signal which is emitted from the ultrasonic wave transmitter 12-2 and then directly received by the ultrasonic wave receiver 13-2 without being reflected from the object.

The output signal from the comparator 13-2f is applied to the time comparator 13-2h. The reference time operating circuit 13-2g operates for the reference time determined by the ultrasonic wave control signal from the ultrasonic wave transmitter 12-2. The reference time is a round trip ultrasonic wave time corresponding to the distance to be detected. The time comparator 13-2h passes the output signal from the comparator 11-2f for the reference time in response to the output signal from the reference time operating circuit 13-2g, whereas blocks output during time other than the reference time.

Then, the output signal from the time comparator 13-2h is adjusted by the signal adjustment unit 13-2i so that it can be processed by the distance information transmitter 15.

Therefore, the measured distance can be defined by the following equation (2):

$$\text{measured distance} = \text{measured time (sec)} * \text{ultrasonic wave transmission speed (m/sec)}/2 \quad (2)$$

The division by 2 in the above equation (2) is performed because the moving distance is a round distance.

The master processor 20, the data processing unit 23 turns on the laser trigger circuit 11-1, when it turns off the ultrasonic wave trigger circuit 11-2, when the car speed sensed by the car speed sensor 22 is higher than the reference speed. Alternatively, when the car speed sensed by the car speed sensor 22 is lower than the reference speed, the data processing unit 23 turns off the laser trigger circuit 11-1, when it turns on the ultrasonic wave trigger circuit 11-2. Then, the data processing unit 23 compares the actual distance obtained based on the laser beam or the ultrasonic wave signal with the calculated safety distance from the car speed sensor 22 and gives the alarm when the dangerous situation is present between the car and the front car in accordance with the compared result. Here, the alarm time is adjustable according to the state of the driver and the alarm condition is as follows:

actual distance<safety distance: alarm actual distance≧safety distance: no alarm In the case where the alarm is given, the brake is applied by the brake controller 24 to decelerate the car.

Figure 5:
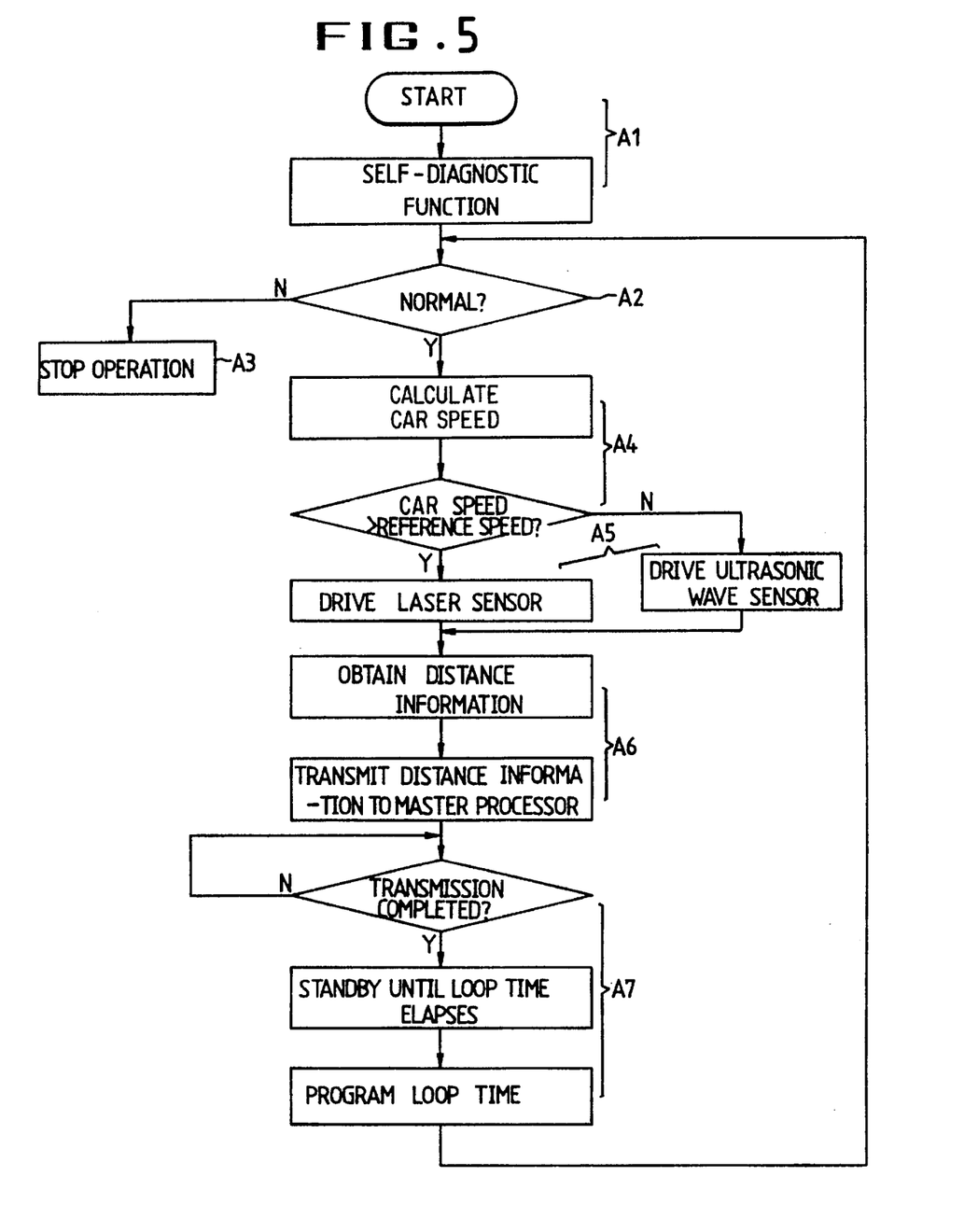
FIG. 5 is a flowchart illustrating an operation of a slave processor in FIG. 1.

FIG. 5 is a flowchart illustrating the operation of the slave processor 10 in FIG. 1. The system is initialized and a self-diagnostic function is performed at the first step A1. It is checked at the second step A2 whether the system is normal. If it is found at the second step A2 that the system is not normal, the operation is stopped at the third step A3. If it is found at the second step A2 that the system is normal, the car speed is calculated at the fourth step A4. Then at the fourth step A4, it is discriminated whether the calculated car speed is higher than the reference speed. If it is discriminated at the fourth step A4 that the calculated car speed is higher than the reference speed, the laser sensor is driven at the fifth step A5. On the contrary, if it is discriminated at the fourth step A4 that the calculated car speed is lower than the reference speed, the ultrasonic wave sensor is driven at the fifth step A5. At the sixth step A6, the distance information is obtained using the laser sensor or the ultrasonic wave sensor driven at the fifth step A5 and the obtained distance information is transmitted to the master processor 20. At the seventh step A7, it is checked whether the transmission of the distance information is completed. If it is found that the transmission of the distance information is completed, the operation stands by until a current loop time elapses. If the current loop time has elapsed, the subsequent loop time is programmed and the counter is cleared.

Figure 6:
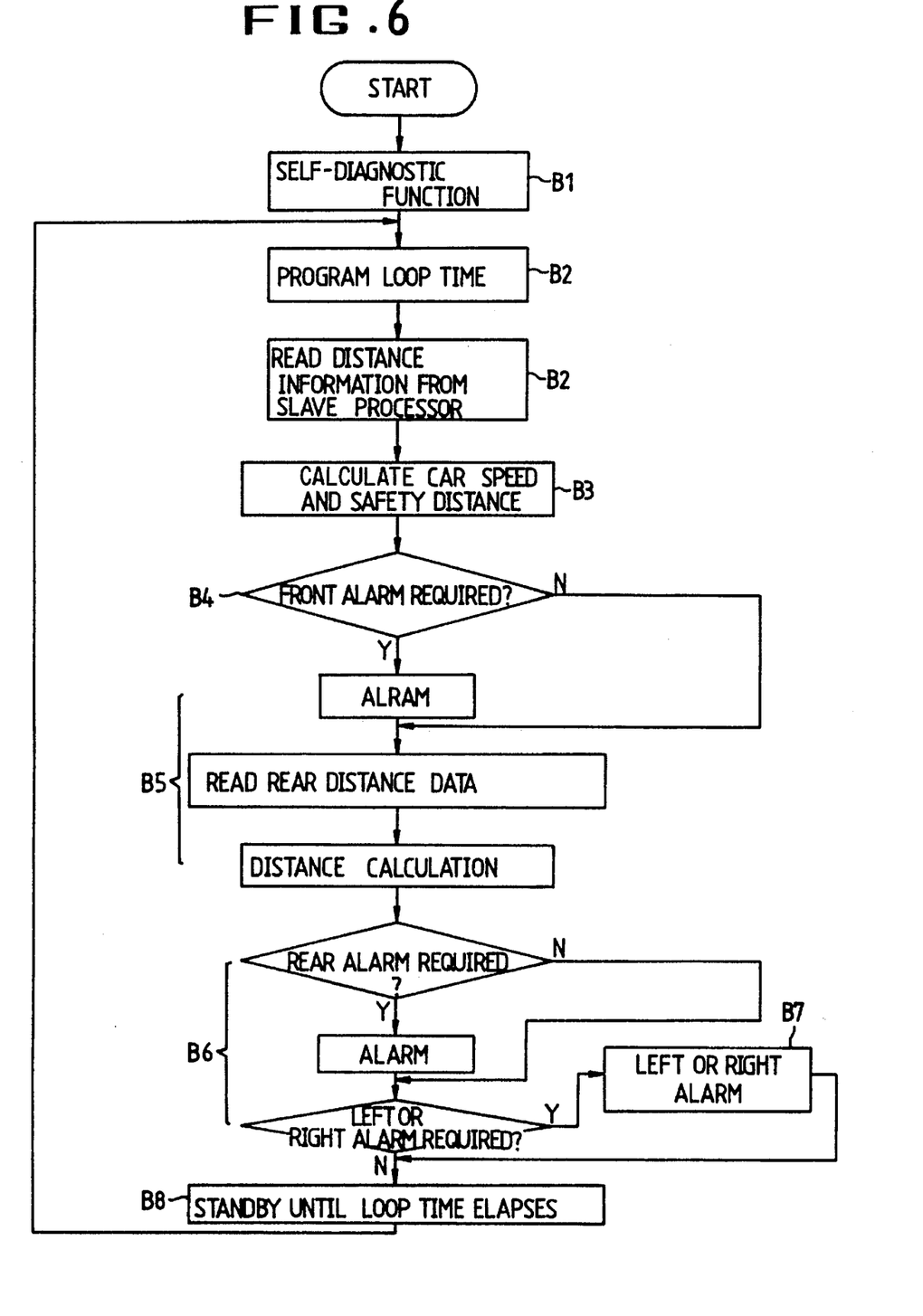
FIG. 6 is a flowchart illustrating an operation of a master processor in FIG. 1.

FIG. 6 is a flowchart illustrating the operation of the master processor 20 in FIG. 1. At the first step B1, the system is initialized and a self-diagnostic function is performed to check whether the system is normal. If it is found at the first step B1 that the system is normal, a loop time is programmed and the distance information from the slave processor 10 is read at the second step B2. At the third step B3, the car speed is calculated and the safety distance between the car and the front car is calculated based on the calculated car speed. At the fourth step B4, the safety distance calculated at the third step B3 is compared with the distance information read at the second step B2 to discriminate whether a front alarm is required. If it is discriminated at the fourth step B4 that the front alarm is required, the front alarm is given at the fifth step B5. On the contrary, if it is discriminated at the fourth step B4 that the front alarm is not required, rear distance data from the slave processor 10 is read at the fifth step B5. It is discriminated at the sixth step B6 whether the rear distance data read at the fifth step B5 is greater than a reference value to check whether a rear alarm is required. If it is found that the rear alarm is required as the rear distance data read is smaller than the reference value, the rear alarm is given. On the other hand, if it is found that the rear alarm is not required as the rear distance data read is greater than the reference value, it is checked whether a left or right alarm is required. If it is found at the sixth step B6 that the left or right alarm is required, the left or right alarm is given at the seventh step B7. On the contrary, if it is found at the sixth step B6 that the left or right alarm is not required, the operation stands by until the loop time elapses, at the eighth step B8. If the loop time has elapsed, the subsequent loop time is programmed to perform the subsequent loop.

As apparent from the above description, according to the present invention, the state of the front car can always be monitored during travel of the car, resulting in the reduction in the collision danger. Also, the different sensors are used in the long and short-distance traveling of the car, respectively, to perform the distance measurement function under the optimum condition. Further, the use of the two processors has the effect of reducing data loss or distortion resulting from electronic interference in the car, enabling a further function addition and providing a rapid response characteristic. Moreover, the control signals are reduced in number, so that a faulty operation of the system can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A car collision prevention apparatus mountable in a car, comprising:

slave processing means for transmitting and receiving one of a laser beam and an ultrasonic wave signal to extract distance information corresponding to a distance between said car and a car in front of said car; and master processing means for comparing the distance information from said slave processing means with a predetermined safety distance corresponding to a desired distance between said car and said car in front based on a car speed of said car and performing car accelerating or decelerating and alarm functions in accordance with a compared result, and for initiating one of a long-distance operation mode and a short-distance operation mode based upon said car speed and a reference speed; said slave processing means including:

laser trigger means for generating a laser trigger pulse signal in response to a drive signal from said master processing means, the laser trigger pulse signal being produced during said long-distance operation mode selected by said master processing means when said car speed is higher than said reference speed;

laser transmission means for emitting said laser beam externally in response to said laser trigger pulse signal from said laser trigger means;

laser reception means for receiving said laser beam after said laser beam is reflected off of said car in front;

ultrasonic wave trigger means for generating an ultrasonic wave trigger pulse signal in response to said drive signal from said master processing means, the ultrasonic wave trigger pulse being produced during said short-distance operation mode selected by said master processing means when said car speed is less than or equal to said reference speed;

ultrasonic wave transmission means for emitting said ultrasonic wave signal externally in response to said ultrasonic wave trigger pulse signal from said ultrasonic wave trigger means and an ultrasonic wave control signal;

ultrasonic wave reception means for receiving said ultrasonic wave signal after said ultrasonic wave signal is reflected off of said car in front;

counting means for generating time data by starting a counting operation in response to the laser trigger pulse signal from said laser trigger means or the ultrasonic wave trigger pulse signal from said ultrasonic wave trigger means and stopping the counting operation in response to an output signal from a respective one of said laser reception means or said ultrasonic wave reception means; and distance information transmission means for converting said time data from said counting means into said distance information and transmitting said distance information to said master processing means; and said ultrasonic wave reception means including:

an ultrasonic wave receiving sensor for receiving the ultrasonic wave signal emitted from said ultrasonic wave transmission means and reflected off of said car in front;

a first amplifier for amplifying said output signal from said ultrasonic wave receiving sensor to produce an amplified output signal;

a band pass filter for band pass filtering said amplified output signal from said first amplifier to remove a noise component therefrom;

a second amplifier for amplifying an output signal from said band pass filter;

a detector for detecting an output signal from said second amplifier and outputting a detected signal in a digital form;

a comparator for comparing said detected signal from said detector with said ultrasonic wave control signal from said ultrasonic wave transmission means;

a reference time operating circuit for generating a reference time period signal in response to the ultrasonic wave control signal from said ultrasonic wave transmission means;

a time comparator for comparing an output signal from said comparator with the reference time period signal from said reference time operating circuit; and a signal adjustment unit for adjusting an output signal from said time comparator to permit processing by said distance information transmission means.

2. A car collision prevention method for use in a car to avoid collision with a car in front of said car, the method comprising the steps of:

(a) transmitting and receiving one of a laser beam and an ultrasonic wave signal during a respective one of long-distance and short-distance operation modes and extracting distance information corresponding to a distance between said car and said car in front based on reception of said one of said laser beam and said ultrasonic wave signal, said transmitting and receiving step and said extracting step being effected by a slave processor;

(b) comparing the distance information from said slave processor with a predetermined safety distance corresponding to a desired distance between said car and said car in front based on a car speed of said car and performing car accelerating or decelerating and alarm functions in accordance with a compared results, and initiating one of the long-distance operation mode and the short-distance operation mode based upon said car speed and a reference speed, said comparing, performing and initiating steps being effected by a master processor;

said step (a) including the steps of:

(a-1) initializing a system and performing a self-diagnostic function;

(a-2) checking whether the system is normal;

(a-3) stopping an operation if it is determined at said step (a-2) that the system is not normal;

(a-4) calculating said car speed if it is determined at said step (a-2) that the system is normal and discriminating whether the calculated car speed is higher than the reference speed;

(a-5) driving a laser and monitoring a laser sensor if it is discriminated at said step (a-4) that the calculated car speed is higher than the reference speed and driving an ultrasonic wave transmitter and monitoring an ultrasonic wave sensor if it is discriminated at said step (a-4) that the calculated car speed is lower than the reference speed;

(a-6) obtaining the distance information using said laser sensor or said ultrasonic wave sensor monitored at said step (a-5) and transmitting the distance information to said master processor; and (a-7) checking whether the transmission of the distance information is completed, standing by until a current loop time elapses if it is checked that the transmission of the distance information is completed, programming a subsequent loop time if the current loop time has elapsed and clearing a counter.

3. A car collision prevention method for use in a car to avoid collision with a nearby car, the method comprising the steps of:

(a) transmitting and receiving one of a laser beam and an ultrasonic wave signal during a respective one of long-distance and short-distance operation modes and extracting distance information corresponding to a distance between said car and said nearby car based on reception of said one of said laser beam and said ultrasonic wave signal; said transmitting and receiving step and said extracting step being effected by a slave processor;

(b) comparing the distance information from said slave processor with a predetermined safety distance corresponding to a desired distance between said car and said nearby car based on a car speed of said car and performing car accelerating or decelerating and alarm functions in accordance with a compared result, and initiating one of the long-distance operation mode and the short-distance operation mode based upon said car speed and a reference speed; said comparing, performing and initiating steps being effected by a master processor; and said step (b) including the steps of:

(b-1) initializing a system and performing a self-diagnostic function to check whether the system is normal;

(b-2) programming a loop time if it is determined at said step (b-1) that the system is normal and reading the distance information from said slave processor;

(b-3) calculating the car speed and calculating the safety distance between the car and the nearby car based on the calculated car speed;

(b-4) comparing the safety distance calculated at said step (b-3) with the distance information read at said step (b-2) to discriminate whether a front alarm is required;

(b-5) operating the front alarm if it is discriminated at said step (b-4) that the front alarm is required and reading rear distance data from said slave processor if it is discriminated at said step (b-4) that the front alarm is not required;

(b-6) discriminating whether the rear distance data read at said step (b-5) is greater than a reference value, to check whether a rear alarm is required, operating the rear alarm if it is determined that the rear alarm is required as the rear distance data is smaller than the reference value and checking whether a left or right alarm is required, if it is determined that the rear alarm is not required where the rear distance data is greater than the reference value;

(b-7) operating the left or right alarm if it is determined at said step (b-6) that the left or right alarm is required; and (b-8) standing by until the loop time elapses, if it is determined at said step (b-6) that the left or right alarm is not required, and, if the loop time has elapsed, programming a subsequent loop time to perform a subsequent loop.

4. A car collision prevention apparatus mountable in a car, comprising:

slave processing means for transmitting and receiving one of a laser beam and an ultrasonic wave signal to extract distance information corresponding to a distance between said car and a car in front of said car;

master processing means for comparing the distance information from said slave processing means with a predetermined safety distance corresponding to a desired distance between said car and said car in front based on a car speed of said car and performing car accelerating or decelerating and alarm functions in accordance with a compared result, and for initiating one of a long-distance operation mode and a short-distance operation mode based upon said car speed and a reference speed;

said slave processing means including:

laser transmission means for transmitting said laser beam in response to a drive signal from said master processing means, the laser beam being produced during said long-distance operation mode selected by said master processing means when said car speed is higher than said reference speed;

laser reception means for receiving said laser beam after said laser beam is reflected off of said car in front;

ultrasonic wave transmission means for transmitting said ultrasonic wave signal in response to said drive signal from said master processing means and an ultrasonic wave control signal, said ultrasonic wave signal being transmitted during said short-distance operation mode selected by said master processing means when said car speed is less than or equal to said reference speed;

ultrasonic wave reception means for receiving said ultrasonic wave signal after said ultrasonic wave signal is reflected off of said car in front;

counting means for generating time data by starting a counting operation in response to the transmission of said laser beam or the transmission of said ultrasonic wave signal and stopping the counting operation in response to an output signal from a respective one of said laser reception means or said ultrasonic wave reception means; and distance information transmission means for determining said distance information based on delayed reception of said one of said laser beam and said ultrasonic wave signal and for transmitting said distance information to said master processing means; and said ultrasonic wave reception means including:

an ultrasonic wave receiving sensor for receiving the ultrasonic wave signal emitted from said ultrasonic wave transmission means and reflected off of said car in front;

a first amplifier for amplifying an output signal from said ultrasonic wave receiving sensor to produce an amplified output signal;

a band pass filter for band pass filtering said amplified output signal from said first amplifier to remove a noise component therefrom;

a second amplifier for amplifying an output signal from said band pass filter;

a detector for detecting an output signal from said second amplifier and outputting a detected signal in a digital form;

a comparator for comparing said detected signal from said detector with said ultrasonic wave control signal from said ultrasonic wave transmission means;

a reference time operating circuit for generating a reference time period signal in response to the ultrasonic wave control signal from said ultrasonic wave transmission means;

a time comparator for comparing an output signal form said comparator with the reference time period signal from said reference time operating circuit; and a signal adjustment unit for adjusting an output signal from said time comparator to produce said output signal from said ultrasonic wave reception means to permit processing by said distance information transmission means.

\* \* \* \* \*